United States Patent [19]

Lyon et al.

[11] Patent Number: 5,697,003
[45] Date of Patent: Dec. 9, 1997

[54] CAMERA WITH COMBINATION MULTI-LAMP FLASH SOURCE AND EXPOSURE COUNTER

[75] Inventors: Ralph Merwin Lyon; Joel Sherwood Lawther, both of Rochester, N.Y.

[73] Assignee: Eastman Kodak Company, Rochester, N.Y.

[21] Appl. No.: 672,604

[22] Filed: Jun. 28, 1996

[51] Int. Cl.⁶ ............................................. G03B 15/03
[52] U.S. Cl. ...................... 396/191; 396/192; 396/197; 396/200; 396/201
[58] Field of Search ............................. 354/132, 142, 354/143, 144, 148, 149.11; 362/14; 396/155, 196, 197, 198, 200, 201, 191, 192

[56] References Cited

U.S. PATENT DOCUMENTS

| | | | |
|---|---|---|---|
| D. 313,422 | 1/1991 | Leonard et al. | D16/209 |
| 2,290,793 | 7/1942 | Alderman | 240/2 |
| 3,609,331 | 9/1971 | Fink et al. | 362/5 |
| 3,860,809 | 1/1975 | Shoupp et al. | 362/17 |
| 3,919,539 | 11/1975 | Winkler et al. | 354/142 |
| 3,935,442 | 1/1976 | Hanson | 240/1.3 |
| 4,098,565 | 7/1978 | Van de Weijer | 362/14 |
| 4,243,371 | 1/1981 | Kewley et al. | 362/15 |
| 4,279,488 | 7/1981 | Hines | 354/145 |
| 4,298,908 | 11/1981 | English et al. | 362/14 |
| 4,652,105 | 3/1987 | Angeli | 354/121 |
| 4,769,660 | 9/1988 | Heinrich | 354/120 |
| 4,921,344 | 5/1990 | Duplantis | 354/62 |
| 5,253,002 | 10/1993 | Kwak | 354/126 |
| 5,448,323 | 9/1995 | Clark et al. | 354/167 |

*Primary Examiner*—Eddie C. Lee
*Attorney, Agent, or Firm*—Roger A. Fields

[57] ABSTRACT

A camera comprising a light sensitive film on which a certain number of exposures can be made, and a multi-lamp flash source having a plurality of one-time-use flash lamps equal in number to the total number of exposures to be made on the film, is characterized in that the multi-lamp flash source has consecutive indicators proximate the respective lamps for indicating the number of exposures available to be made and is supported for movement to move the respective lamps from a storage to a use position for illuminating a subject to be photographed and, substantially simultaneously, to move the respective indicators from a concealed to a visible position.

4 Claims, 3 Drawing Sheets

CAMERA WITH COMBINATION MULTI-LAMP FLASH SOURCE AND EXPOSURE COUNTER

CROSS-REFERENCE TO RELATED APPLICATIONS

Reference is made to commonly assigned copending applications Ser. No. 08/674,220, [our Docket No. 74061RAF], entitled CAMERA WITH MULTI-LAMP FLASH WHEEL and filed Jun. 28, 1996 in the names of Joel S. Lawther and Ralph M. Lyon, and Ser. No. 08/674,238, [our Docket No. 74095RAF], entitled CAMERA WITH COMBINATION MULTI-LAMP FLASH SOURCE AND EXPOSURE COUNTER and filed Jun. 28, 1996 in the names of Stanley W. Stephenson and Dana W. Wolcott.

FIELD OF THE INVENTION

The invention relates generally to the field of photography, and in particular to camera with a combination multi-lamp flash source and exposure counter.

BACKGROUND OF THE INVENTION

Manufacturers often look for ways to make a camera relatively compact and inexpensive.

It is known for a camera to comprise a light sensitive film on which a certain number of exposures can be made, and a multi-lamp flash source having a plurality of one-time-use flash lamps equal in number to the total number of exposures to be made on the film. See U.S. Pat. No. 4,769,660, issued Sep. 6, 1988. This design, though inexpensive, is less than compact.

SUMMARY OF THE INVENTION

A camera comprising a light sensitive film on which a certain number of exposures can be made, and a multi-lamp flash source having a plurality of one-time-use flash lamps equal in number to the total number of exposures to be made on the film, is characterized in that:

the multi-lamp flash source has consecutive indicators proximate the respective lamps for indicating the number of exposures available to be made and is supported for movement to move the respective lamps from a storage to a use position for illuminating a subject to be photographed and, substantially simultaneously, to move the respective indicators from a concealed to a visible position.

DETAILED DESCRIPTION OF THE INVENTION

Figure 1:
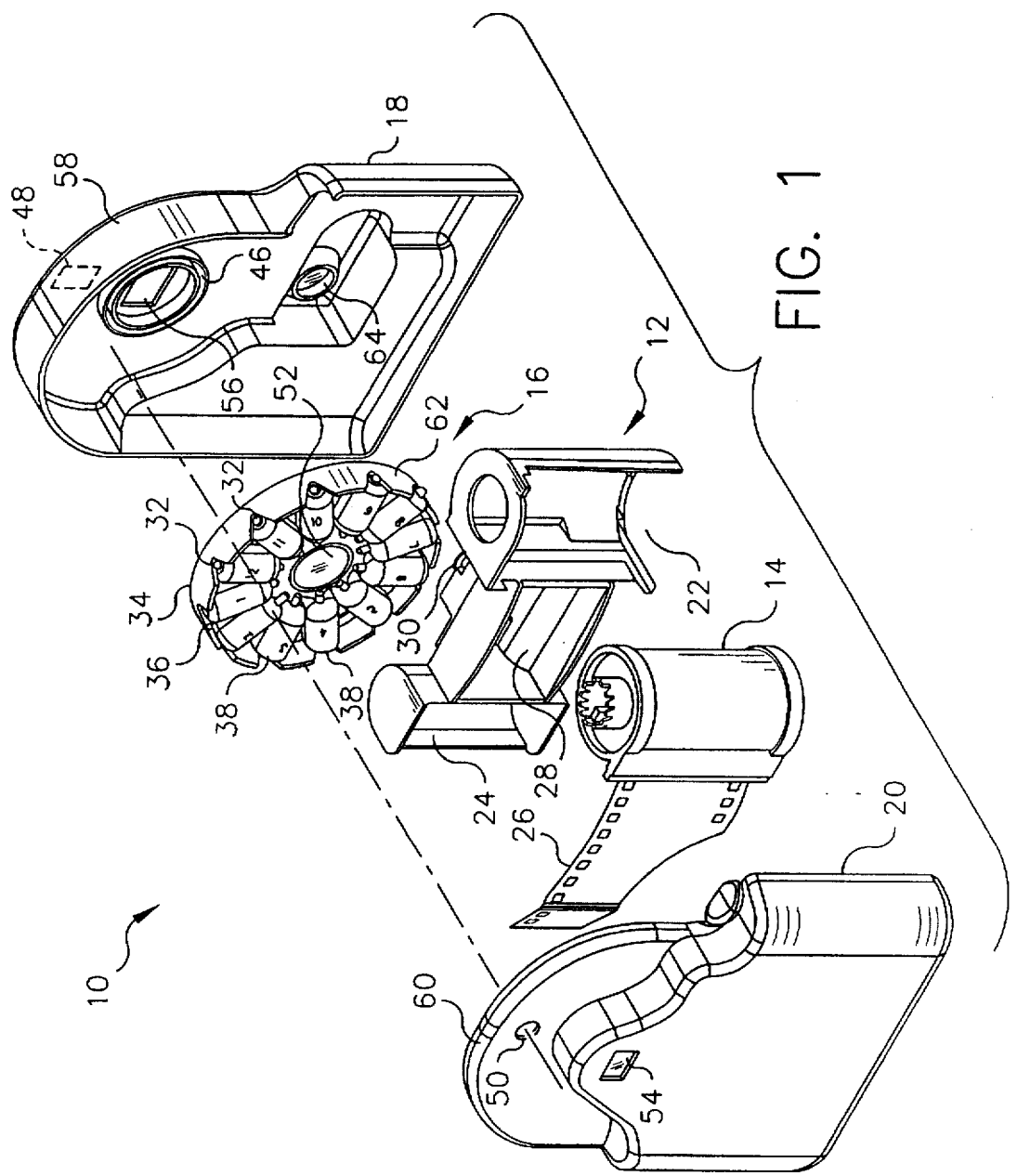
FIG. 1 is an exploded rear perspective view of a camera with a combination multi-lamp flash source and exposure counter according to a preferred embodiment of the invention.

The invention is disclosed as being embodied preferably in a camera with a multi-lamp flash wheel. Because the features of a camera with a multi-lamp flash wheel are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a camera 10 comprising a main body section 12, a known 35 mm film cartridge 14, and a multi-lamp flash wheel 16, enclosed within a front housing section 18 and a rear housing section 20 which are secured together.

The main body section 12 has a open-top cartridge chamber 22 for the film cartridge 14, a film roll chamber 24 into which an unexposed filmstrip 26 is prewound from the film cartridge during manufacture of the camera 10, and a film exposure chamber 28 interconnecting the cartridge chamber and the film roll chamber. The unexposed filmstrip 26 is capable of having only twelve exposures made on it. A taking lens 30 is supported over a front opening in the main body section 12 to the film exposure chamber 28.

The multi-lamp flash wheel 16 includes a circular array of twelve one-time-use flash lamps 32, i.e. one lamp for each exposure to be made on the filmstrip 26. The flash lamps 32 are sandwiched between a front lamp cover wheel 34 and a rear flash reflector ring 36. See FIGS. 1–3. The flash reflector ring 36 has twelve integrally formed rear reflectors 38 for the respective lamps 32 and several slots 40 that receive respective stems or hooks 42 to connect the flash reflector ring and the lamp cover wheel 34 together to securely hold the flash lamps 32 in their circular array. Twelve consecutively numbered indicators "1", "2", "3", "4", "5", "6", "7", "8", "9", "10", "11" and "12" are imprinted on the respective reflectors 38 for indicating the number of exposures available (remaining) to be made at any time. As shown in FIG. 3, the lamp cover wheel 34 has an annular protuberance 44 that is received in a correspondingly-shaped support slot 46 on the inside of the front housing section 18 to rotationally support the multi-lamp flash wheel 16 for rotation of the respective lamps 32 from a storage or concealed position to a use position behind a flash emission opening 48 in the front housing section and, substantially simultaneously, for rotation of the respective indicators "1"–"12" from a concealed position to a visible position behind a viewing opening 50 in the rear housing section 20.

The lamp cover wheel 34 is transparent to transmit the illumination from each of the flash lamps 32 in the use position and has an integral formed front viewfinder lens 52 that is centered within the lamp's circular array at the axis of rotation of the multi-lamp flash wheel 16. See FIG. 3. The front viewfinder lens 52 is optically aligned with a rear viewfinder lens 54 fixed within a lens opening in the rear housing section 20 and is located behind a viewfinder opening 56 in the front housing section. See FIG. 1. Thus, rotation of the front viewfinder lens 52 with the multi-lamp flash wheel 16 has no affect when viewing a subject to be photographed through the front and rear viewfinder lenses.

As shown in FIG. 1, the front and rear housing sections 18 and 20 have respective top portions 58 and 60 that are similarly curved in respective arcs to conform with a circular periphery 62 of the lamp cover wheel 32. The front housing section 18 includes a retractable split-cover 64 for the taking lens 30.

Figure 2:
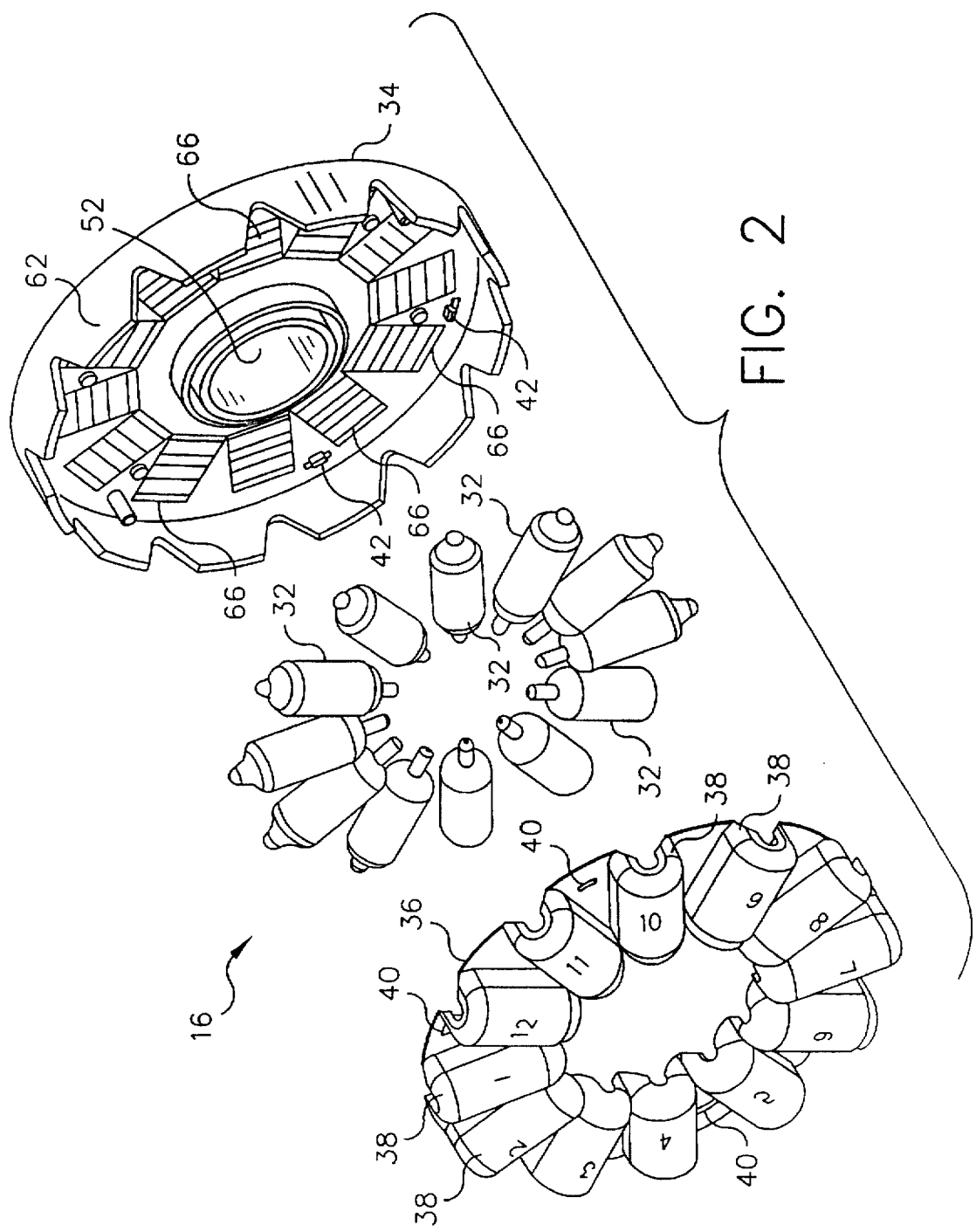
FIG. 2 is an exploded rear perspective view of the combination multi-lamp flash source and exposure counter.
Figure 3:
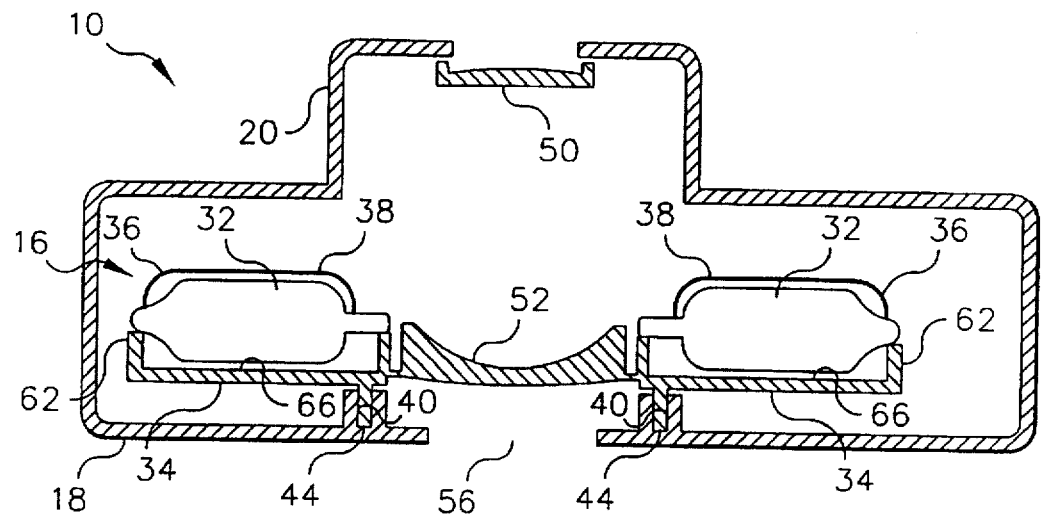
FIG. 3 is a sectional view of an upper portion of the camera including the combination multi-lamp flash source and exposure counter.
Figure 4:
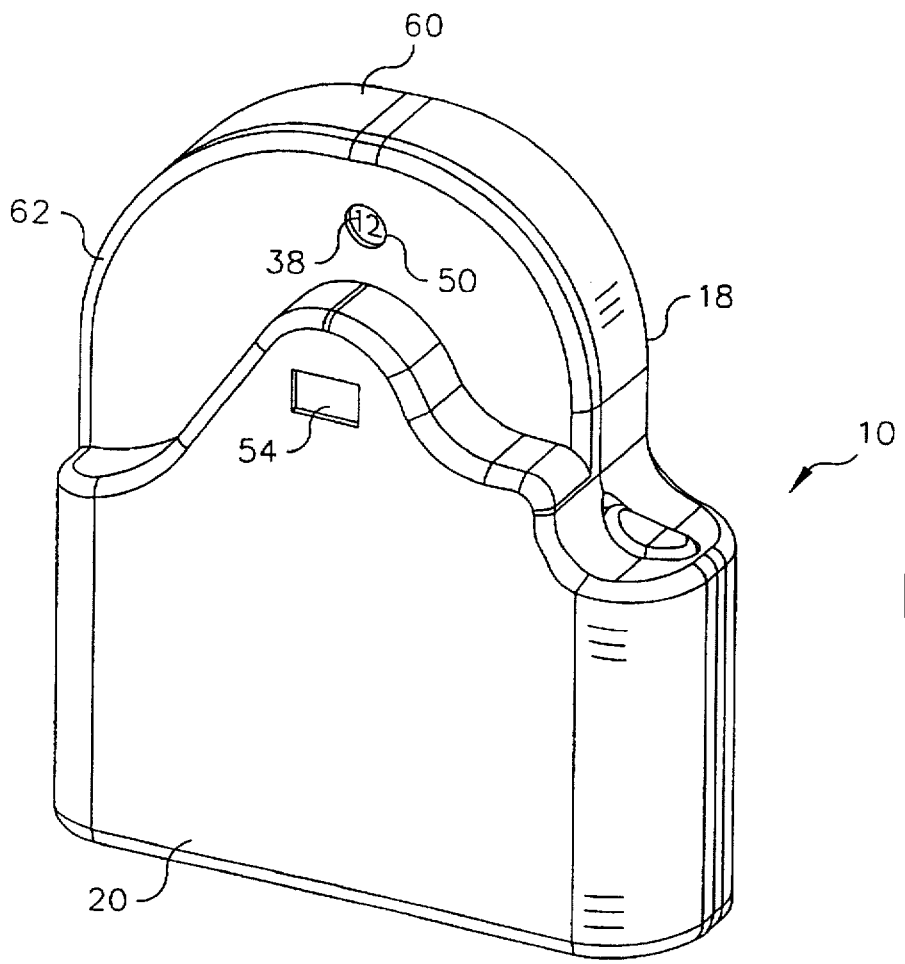
FIG. 4 is an assembled rear perspective view of the camera.

As shown in FIGS. 2 and 3, respective known Fresnel lenses 66 or the like are integrally formed on the lamp cover wheel 34 opposite the flash lamps 32.

The invention has been described with reference to a preferred embodiment. However, it will be appreciated that variations and modifications can be effected by a person of ordinary skill in the art without departing from the scope of the invention. For example, in place of the front viewfinder lens 52 on the lamp cover wheel 34, the camera 10 could be redesigned to provide the taking lens 30 in place of the front viewfinder lens.

PARTS LIST
10. camera
12. main body section
14. film cartridge
16. multi-lamp flash wheel
18. front housing section
20. rear housing section
22. cartridge chamber
24. film roll chamber
26. unexposed filmstrip
28. film exposure chamber
30. taking lens
32. flash lamps
34. lamp cover wheel
36. flash reflector ring
38. reflectors
40. slots
42. stems
44. annular protuberance
46. corresponding support slot
48. flash emission opening
50. viewing opening
52. front viewfinder lens
54. rear viewfinder lens
56. viewfinder opening
58. top portion
60. top portion
62. circular periphery
64. split-cover
66. Fresnel lenses

We claim:

1. A camera comprising a light sensitive film on which a certain number of exposures can be made, and a multi-lamp flash source having a plurality of one-time-use flash lamps equal in number to the total number of exposures to be made on said film, is characterized in that:

said multi-lamp flash source has a single set of consecutive aligned indicators proximate the respective lamps, and equal in number to total number of the respective lamps, for indicating the number of exposures available to be made and is supported for movement to move the respective lamps from a storage to a use position for illuminating a subject to be photographed and, substantially simultaneously, to move the respective indicators from a concealed to a visible position; and a housing completely encloses said multi-lamp flash source for concealing the respective lamps and the respective indicators, and has a single flash emission opening for successively revealing the respective lamps, only when one of said flash lamps is in the use position, and a single viewing opening separate from said flash emission opening for successively revealing the respective indicators, only when one of said indicators is in the visible position.

2. A camera as recited in claim 1, wherein said multi-lamp flash source is rotatable to move said flash lamps one at a time to the use position in said flash emission opening and, substantially simultaneously, to move said indicators one at a time to the visible position in said viewing opening.

3. A camera as recited in claim 1, wherein said housing has a front section which includes said flash emission opening and a rear section which includes said single viewing opening.

4. A camera as recited in claim 1, wherein said multi-lamp flash source has rear flash reflectors for the respective lamps, and said indicators are located directly on the respective flash reflectors.

* * * * *